United States Patent [19]

Schubert et al.

[11] 4,189,644

[45] Feb. 19, 1980

[54] SMOKE DETECTOR IONIZATION CHAMBER

[75] Inventors: Wolfgang Schubert, Bubikon; Bernhard Durrer, Stäfa, both of Switzerland

[73] Assignee: Cerberus AG, Männedorf, Switzerland

[21] Appl. No.: 854,077

[22] Filed: Nov. 23, 1977

[30] Foreign Application Priority Data

Dec. 1, 1976 [CH] Switzerland ....................... 15144/76

[51] Int. Cl.[2] ................................................ G01T 1/18

[52] U.S. Cl. ....................................... 250/381; 313/54; 313/149; 340/629

[58] Field of Search ................ 250/381, 385; 340/629; 313/149, 214, 54, 148; 324/33

[56] References Cited

U.S. PATENT DOCUMENTS

| | | | |
|---|---|---|---|
| 2,548,385 | 4/1951 | Marshall | 313/148 |
| 4,007,374 | 2/1977 | Solomon | 250/381 |
| 4,021,671 | 5/1977 | Solomon | 250/381 |

*Primary Examiner*—Alfred E. Smith
*Assistant Examiner*—Carolyn E. Fields
*Attorney, Agent, or Firm*—Frishauf, Holtz, Goodman & Woodward

[57] ABSTRACT

An ionization chamber of the type used in an ionization smoke detector is made adjustable. The chamber has two electrodes and one radioactive source for ionizing the electrode gap. One of the electrodes is laterally displaceable relative to the other. As a result of displacement of this electrode, areas of the electrode with differing geometrical configurations can be brought into the ionization zone of the radioactive source.

Several different embodiments of the electrode with different geometrical configurations are described.

14 Claims, 10 Drawing Figures

SMOKE DETECTOR IONIZATION CHAMBER

BACKGROUND OF THE INVENTION

The invention relates to an ionization chamber with two electrodes and a radioactive source for ionizing the electrode gap, particularly for use in an ionization smoke detector.

Known ionization smoke detectors usually use two series-connected ionization chambers with different smoke sensitivities. For example, one of the chambers, normally called the measuring ionization chamber, can be constructed so as to be substantially accessible to air, while the other chamber, normally called the reference ionization chamber, is substantially shielded against the access of air or is sealed off from the atmosphere. Such ionization smoke detectors utilize the principle that, due to the attachment processes of the atmospheric ions formed by the radioactive source, when heavier particles such as smoke or other airborne combustion products penetrate the chamber, the ionic current flowing between the electrodes is reduced. As a result, the chamber resistance increases. As the reference ionization chamber is not affected, or is scarcely affected by smoke, its ionic current remains virtually constant, particularly if operated in the saturation range. Thus, the voltage drop across the measuring ionization chamber rises when smoke penetrates the chamber, and an evaluation circuit connected to the chamber emits an alarm signal if the voltage drop exceeds a predetermined threshold.

In practice, it is often necessary to change the threshold value and the sensitivity of such an ionization smoke detector in order to adapt them to ambient conditions. On the one hand, this can take place electrically by changing the evaluation circuit, and on the other hand it can be carried out by varying the ionic current or the resistance of one of the two ionization chambers. Various ionization smoke detectors are known in which the ionic current or the resistance either of the measuring ionization chamber or of the reference ionization chamber is changed by modifying the spacing between the two electrodes. Preferably, the reference ionization chamber is used, because in this case the geometrical conditions, and consequently the smoke sensitivity of the measuring ionization chamber, are only slightly affected.

However, in such known ionization chambers the change of spacing is preferably brought about by a screw to which the usually disc-shaped adjustable electrode is fitted. However, such constructions have proved to be mechanically unstable, particularly under the action of vibrations and impacts. In addition, the spacing and sensitivity cannot be adjusted with sufficient accuracy and precision. Furthermore, the ionic current change obtainable by such a modification of the spacing is smaller than that which would be theoretically possible, i.e. it does not have an optimum action. A further disadvantage is that such known adjusting mechanism take up a large amount of space outside the ionization chamber, and therefore, for example when used in an ionization smoke detector, can undesirably increase its total height.

The problem of the present invention is to eliminate the above disadvantages and provide an ionization chamber in which the ionic current or resistance can be adjusted in a reliable and optimum manner without the risk of any self-adjustment over a period of time under the influence of vibrations and impacts, whereby the space requirements are reduced and the stability and operating reliability increased.

SUMMARY OF THE INVENTION

According to the invention, this problem is solved in that one of the electrodes is laterally displaceable relative to the other electrode, whereby through a displacement, areas of the displaceable electrode with a differing geometrical configuration can be brought into the ionization zone of the radioactive source.

DESCRIPTION OF THE PREFERRED EMBODIMENTS

Figure 1A:
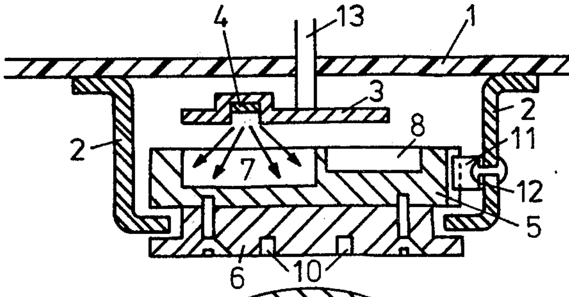
FIG. 1*a* is a sectional side view of an ionization chamber in accordance with a first embodiment of the present invention.
Figure 1B:
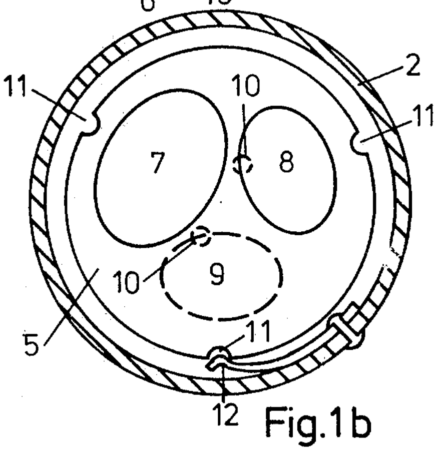
FIG. 1*b* is a partially sectioned top view of the chamber of FIG. 1*a*.
Figure 1C:
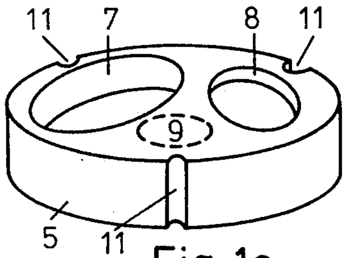
FIG. 1*c* is an elevational view of one of the electrodes of the chamber of FIG. 1*a*.

In the case of the ionization chamber shown in cross-section, plan view and perspective view in FIGS. 1*a* to 1*c*, in which corresponding parts have like reference numerals, a cylindrical chamber 2 is fixed to a mounting plate 1. A post 13 to which a disc-shaped electrode 3 is fixed passes through the center of the mounting plate. Outside the center, a radioactive source 4 is placed on electrode 3. To ensure that radiation is preferably irradiated vertically relative to electrode 3, the source can be arranged in countersunk manner on the electrode, or the lateral radiation can be shielded by an annular shield surrounding source 4. A disc formed from an inner part 5 screwed together with an outer part 6 is placed in the base of chamber 2. Outer part 6 is provided with slots or holes 10, into which can be introduced a screw driver or a special tool so that the complete disc 5, 6 can be turned about the central axis.

Figure 1D:
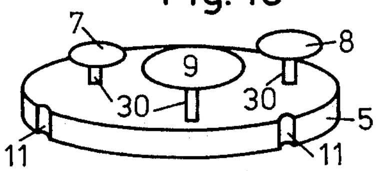
FIG. 1*d* is an elevational view of an electrode alternative to that of FIG. 1*c*.

On the inside of inner part 5 are provided a plurality of holes 7, 8 with different cross-sections and/or different depth. By rotating the disc 5, 6 about the central axis, the various holes 7, 8 can be pivoted below the ionization zone of the radioactive source 4. Thus, an ionization chamber is formed with a differing geometrical configuration, and consequently a differing ionic current and resistance. In addition to the holes in disc 5, it is also possible to provide a flat area 9 on the inside of disc 5 as a further active electrode zone for the formation of an ionization current, whereby in this position the electrode gap, and consequently the resistance of the ionization chamber, are smallest. In order to stop the disc 5 in precisely defined positions in which the individual holes or electrodes zones face the source 4, the same number of slots 11 as there are holes are provided on the edge of disc 5. A spring 12 fixed to chamber 2 is able to engage in said slots 11. This provides a reliable and precisely defined possibility of adjusting the resistance of the ionization chamber. The three different positions can be replaced by two positions or a larger number of positions; even a continuous adjustment is possible. As shown in FIG. 1*d* the active electrode zones 7, 8, 9 can be in the form of discs instead of holes, whereby studs 30 with different heights are located on rotary disc 5.

Figure 2A:
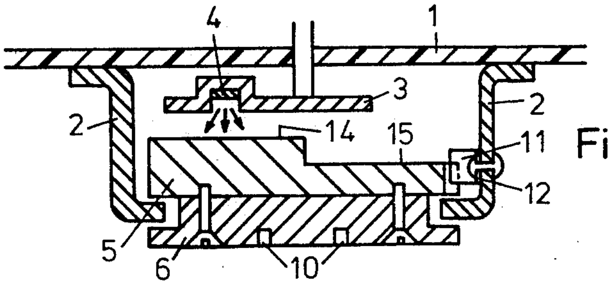
FIG. 2*a* is a side sectional view of an ionization chamber in accordance with a second embodiment of the present invention.
Figure 2B:
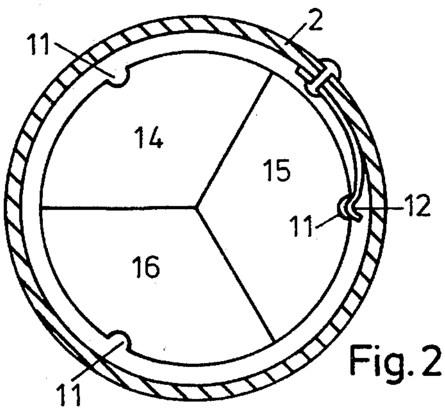
FIG. 2*b* is partially sectioned top view of the chamber of FIG. 2*a*.
Figure 2C:
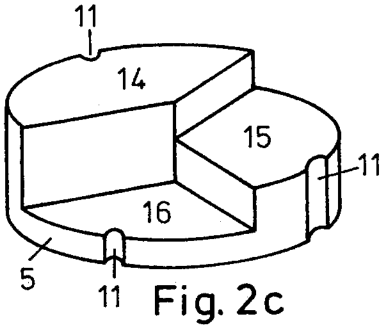
FIG. 2*c* is an elevational view of one of the electrodes of the chamber of FIG. 2*a*.

The embodiment according to FIGS. 2*a* to 2*c* differs from that described above in the construction of the rotary disc 5. Instead of being provided with a plurality of cylindrical holes, disc 5 has sector-shaped shoulders 14, 15 and 16 which, by rotating the outer disc 6 about the central axis, can once again be brought into the ionization zone of source 4. Such a construction has proved particularly effective with respect to the resistance change attainable, because a larger proportion of the radiation emitted by the radioactive source 4 is utilized. The height of the shoulders and the angles of the individual sectors need not be the same, but can instead be selected in accordance with the desired sensitivity stages. A reliable gradual resistance and sensitivity adjustment is once again ensured by slots 11 on the periphery of inner disc 5 and by locking spring 12 fitted to the chamber.

Figure 3:
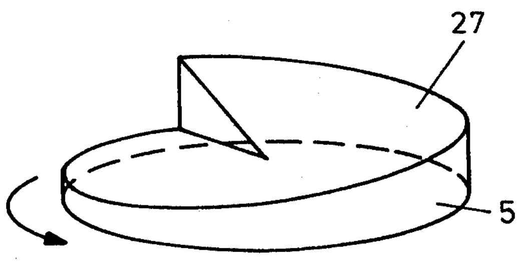
FIG. 3 is an elevational view of an alternative electrode configuration for an ionization chamber in accordance with the present invention.

Instead of this, according to the embodiment of FIG. 3, the inside of disc 5 can be constructed in such a way that its height, and consequently the distance from counter-electrode 3, has a continuous pattern, e.g. in the form of a spiral surface 27. An ionization chamber provided with such a disc 5 can thus be continuously adjusted from the back with respect to its electrode spacing or resistance. The setting can be read off marks on the back of outer disc 6 and on the bottom of the chamber.

An ionization chamber of the described type is particularly suitable for use in an ionization smoke detector. In that case, the reference ionization chamber is usually fitted to the back of the detector on a mounting plate 1. As the adjusting mechanism 10 is located on the bottom of the chamber, the reference ionization chamber of such an ionization smoke detector can be easily adjusted from the rear by means of a screw driver or special tool, and the sensitivity of the detector can be regulated to a desired value. However, it would also be conceivable for the measuring ionization chamber of an ionization smoke detector to be permeable to air. Then, the sensitivity would be adjusted from the front in an identical manner. However, the disadvantage thereof is that the chamber geometry and the physical conditions in the chamber are changed. Thus, the reference ionization chamber which is connected in series with the measuring chamber is preferably equipped in a known manner with the adjusting mechanism.

Figure 4:
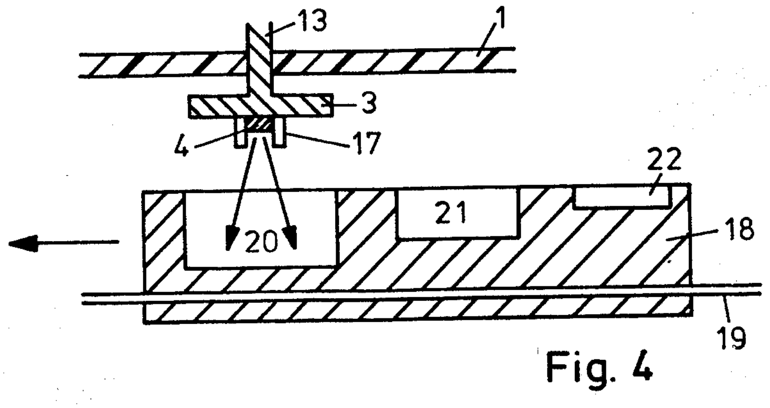
FIG. 4 is a side sectional view of an ionization chamber in accordance with a third embodiment of the present invention and including a slot-like displaceable electrode.

It is pointed out that the adjusting mechanism need not be constructed as a rotary disc whose inside carries zones with different electrode spacings. For example, in the manner shown in FIG. 4 the different chamber areas 20, 21 and 22 can also be provided on a member 18 displaceable by means of a slide 19, whereby the individual areas are brought by a linear displacement under the counter-electrode 3 or into the ionization zone of radioactive source 4 which is limited by an annular shield 17 about source 4.

Figure 5:
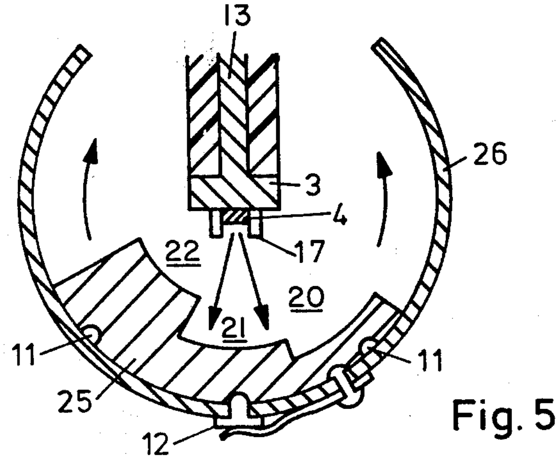
FIG. 5 is a side sectional view of an ionization chamber in accordance with a fourth embodiment of the present invention and including a sleeve-like displaceable electrode.

As shown in FIG. 5, it is also possible to fit to a cylindrical casing 26 with a horizontal rotation axis passing approximately through counter-electrode 3 or radioactive source 4, whereby the individual electrode zones 20, 21 and 22 are pivoted under the source by rotating electrode 25 on cylindrical wall 26.

It is common to all these exemplified embodiments that the movable electrode is displaced laterally relative to the other electrode, and not as in the known constructions by a movement in the direction of the other electrode. This lateral movement can, for example, take place by means of a rotating disc, with the disc rotation axis being displaced relative to the radioactive source 4 or counter-electrode 3 by means of a linearly movable slide or by means of a cylinder whose rotation axis passes approximately through the radioactive source or the counter-electrode and whose casing contains the electrode zones. Thus, in all cases a reliable, accurate adjustment with optimum action is achieved.

It is also pointed out that instead of electrode 5, which carries the areas with differing geometrical configurations, the other electrode 3 can also be constructed in a movable manner, because the essential point is the relative movement of the two electrodes 3 and 5 in the lateral direction relative to one another. For example, in the first two embodiments electrode 5 can be fixed or can form part of chamber 2, while the other electrode 3, together with source 4, can rotate about post 13.

Furthermore, instead of being placed on electrode 3, radioactive source 4 can be located at another point, e.g. on the inner wall of chamber 2. The important thing is that when pivoting in the individual electrode zones, only these zones enter the ionization region. To this end it is advantageous to elect the isotope of the radioactive source 4 in such a way that the ionization zone is limited to only one of the electrode zones or the radiation is kept away from the other electrode zones by suitable shields. It is also possible to position the radioactive source centrally in the ionization chamber, i.e. in the axis of symmetry of chamber 2 in FIGS. 1 or 2, while arranging the rotary disc 5 asymmetrically, so that its axis of rotation is located outside the source or the axis of symmetry of the chamber.

We claim:

1. An ionization chamber of the type used in an ionization smoke detector and having two electrodes and one radioactive source for ionizing the electrode gap, the improvement therein comprising electrode areas with differing geometrical configurations on at least one of said electrodes, and means for laterally displacing one of said electrodes relative to the other, whereby areas of said one electrode with differing geometrical configurations are brought into the ionization zone of said radioactive source.

2. An ionization chamber according to claim 1, wherein the areas of differing geometrical configuration are constructed as holes with different dimensions in the displaceable electrode.

3. An ionization chamber according to claim 1, wherein the areas of differing geometrical configuration are constructed as step-like shoulders of varying height.

4. An ionization chamber according to claim 1, wherein the displaceable electrode has a continuously variable thickness.

5. An ionization chamber according to claim 1, wherein the areas of different geometrical configuration are circular sectors of differing height on the surface of a rotary disc whose axis of rotation is located outside the zone of the radioactive source or the other electrode.

6. An ionization chamber according to claim 1, wherein the areas of different geometrical configuration comprise parts of a spirally shaped surface of a rotary disc whose axis of rotation is located outside the zone of the radioactive source or the other electrode.

7. An ionization chamber according to claim 1, wherein the areas of different geometrical configuration are located on a rotary disc whose axis of rotation is located outside the zone of the radioactive source of the other electrode and wherein means for the engagement of the rotary disc in clearly defined positions are provided on the periphery of the rotary disc and on a chamber which surrounds the ionization chamber.

8. An ionization chamber according to claim 1, wherein the areas of differing geometrical configuration are provided on a linearly displaceable slide.

9. An ionization chamber according to claim 1, wherein the areas of differing geometrical configuration are provided on the surface of a cylinder whose rotation axis passes approximately through the radioactive source or the other electrode.

10. An ionization chamber according to claim 1, wherein it is fitted to the mounting plate of an ionization smoke detector.

11. An ionization chamber according to claim 1, wherein it is fitted in an ionization smoke detector in such a way that the device for displaying one electrode is operable from outside the ionization smoke detector.

12. An ionization chamber according to claim 1, wherein the ionization chamber is the reference ionization chamber of an ionization smoke detector.

13. An ionization chamber according to claim 1, wherein the areas of different geometrical configuration are located on a rotary disc whose axis of rotation is located outside the zone of the radioactive source or the other electrode.

14. An ionization chamber according to claim 13, wherein the areas of differing geometrical configuration are cylindrical bores with a circular or elliptical cross-section in the rotary disc.

* * * * *